US012570414B2

(12) United States Patent
Allison et al.

(10) Patent No.: US 12,570,414 B2
(45) Date of Patent: Mar. 10, 2026

(54) SPACECRAFT DUAL USE DEPLOYABLE ELEMENT

(71) Applicant: Government of the United States as represented by the Secretary of the Air Force, Rome, NY (US)

(72) Inventors: Jonathan Allison, Albuquerque, NM (US); Derek Doyle, Albuquerque, NM (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 203 days.

(21) Appl. No.: 18/301,470

(22) Filed: Apr. 17, 2023

(65) Prior Publication Data

US 2024/0343417 A1     Oct. 17, 2024

(51) Int. Cl.
| | |
|---|---|
| *B64G 1/66* | (2006.01) |
| *B64G 1/22* | (2006.01) |
| *B64G 1/44* | (2006.01) |
| *H01Q 1/08* | (2006.01) |
| *H01Q 1/28* | (2006.01) |
| *H01Q 1/44* | (2006.01) |

(Continued)

(52) U.S. Cl.
CPC ............. *B64G 1/66* (2013.01); *B64G 1/2221* (2023.08); *B64G 1/443* (2013.01); *H01Q 1/08* (2013.01); *H01Q 1/288* (2013.01); *H01Q 1/44* (2013.01); *H01Q 5/22* (2015.01); *H01Q 15/142* (2013.01); *H01Q 19/18* (2013.01); *H02S 30/20* (2014.12)

(58) Field of Classification Search
CPC .......... H01Q 1/08; H01Q 1/081; H01Q 1/082; H01Q 1/084; H01Q 1/10; H01Q 1/103;

H01Q 1/106; H01Q 1/1235; H01Q 1/288; H01Q 1/44; H01Q 5/22; H01Q 15/14; H01Q 15/141; H01Q 15/142; H01Q 19/10; H01Q 19/18; B64G 1/22; B64G 1/221; B64G 1/2221–2229; B64G 1/44; B64G 1/443; B64G 1/446; B64G 1/66; H02S 10/40; H02S 30/20
See application file for complete search history.

(56) References Cited

U.S. PATENT DOCUMENTS

| | | | | |
|---|---|---|---|---|
| 5,320,685 A | * | 6/1994 | Hilgarth | ................. B64G 1/443 |
| | | | | 136/262 |
| 10,014,586 B2 | * | 7/2018 | Cohen | .................... H01Q 1/288 |

OTHER PUBLICATIONS

P. Dreyer, M. Morales-Masis, S. Nicolay, C. Ballif and J. Perruisseau-Carrier, "Copper and Transparent-Conductor Reflectarray Elements on Thin-Film Solar Cell Panels," in IEEE Transactions on Antennas and Propagation, vol. 62, No. 7, pp. 3813-3818, Jul. 2014, doi: 10.1109/TAP.2014.2316539.

* cited by examiner

*Primary Examiner* — Robert Karacsony
(74) *Attorney, Agent, or Firm* — AFRL/RIJ; Matthew D. Fair

(57) ABSTRACT

A deployable spacecraft element which has a solar energy collection and conversion means on one side of the deployable element and a radio frequency reflecting means on the other side of the deployable element. While the solar collection and conversion means and the radio frequency reflecting means are nominally oriented in opposite spatial directions and dependent on the orientation of the spacecraft to orient for solar collection or radio frequency transmission, one or more deployable elements may be mounted to a gimbal to allow for simultaneous solar collection and radio frequency collection by the spacecraft.

14 Claims, 6 Drawing Sheets

(51) Int. Cl.

| | | |
|---|---|---|
| *H01Q 5/22* | (2015.01) |
| *H01Q 15/14* | (2006.01) |
| *H01Q 19/18* | (2006.01) |
| *H02S 30/20* | (2014.01) |

SPACECRAFT DUAL USE DEPLOYABLE ELEMENT

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of spacecraft such as satellites. More specifically, the invention relates to power generation and communications, and radio frequency (RF) transmission subsystems for satellites. The invention discloses apparatuses and methods for deployable solar power generation and radio frequency (RF) antennas sharing a common structure.

A conceptual scaling law analysis elucidates the merits and costs of large and small satellites and provides a guide to the future of spacecraft design. First, large satellites are expensive, this is because complexity scales linearly with interactions among components i.e., deconfliction between various components & subsystems and interactions scale polynomially with number of components. Size, mass, and cost scales linearly with number of components, thus satellite cost scales polynomially with size/mass. Given this reality, it would appear that accomplishing a mission with more smaller satellites rather than fewer large satellites ought to be cheaper. In actuality to date, big payloads on a single vehicle have been required to accomplish missions. However, newer payloads are becoming more compact, which provides an opportunity for serious savings and therefore the motivation for small satellites.

Currently, most spacecraft have separate solar arrays and reflectors. Having separate solar arrays and reflectors has been useful for large satellites to achieve high performance, but it does not necessarily scale down especially well for smaller satellites seeking to replace larger satellites. In such a situation, volume in the stowed (launch) condition is generally tightly constrained. The ability to achieve two apertures for the volume of one is a great volume savings opportunity.

The small satellite challenge is for as many missions as possible be accomplished on small satellite platforms, yielding cost savings & more missions achieved within a fixed budget. The pathway to achieve this vision is miniaturized payloads for all missions and enabling techs for achieving sufficient 'aperture'. Aperture is defined here as the required area to sufficiently couple the spacecraft with its environments to achieve mission requirements. Four important types of aperture are: RF reflector aperture, phased array aperture, electrooptical aperture, solar array aperture, and thermal radiator aperture. All of these apertures are required to permit the spacecraft to perform its mission and function in the context of its environment and all depend upon having sufficient exposed area to perform their function.

OBJECTS AND SUMMARY OF THE INVENTION

It is therefore an object of the present invention to provide a solar power collection and generation apparatus for an on-orbit spacecraft.

It is a further object of the present invention to provide a radio frequency (RF) aperture apparatus for on-orbit spacecraft.

It is still a further object of the present invention to provide an apparatus that combines solar power collection and generation and a radio frequency (RF) aperture as a common deployable spacecraft element.

Briefly stated, the present invention achieves these and other objects through the utilization of a deployable spacecraft element which has a solar energy collection and conversion means on one side of the deployable element and a radio frequency reflecting means on the other side of the deployable element. While the solar collection and conversion means and the radio frequency reflecting means are nominally oriented in opposite spatial directions and dependent on the orientation of the spacecraft to orient for solar collection or radio frequency transmission, one or more deployable elements may be mounted to a gimbal to allow for simultaneous solar collection and radio frequency collection by the spacecraft.

According to an embodiment of the present invention, a dual use deployable element for spacecraft, has a deployable substrate having a first layer and second layer where the first layer comprises a solar-to-electric collection and conversion means. The second layer comprises a radio frequency reflection means. The substrate comprises mechanical support for the first and said second layers with each of the first and said second layers being disposed on the substrate. The solar-to-electric collection and conversion means and the radio frequency reflection means are oriented so as to focus in spatially opposed directions.

According to another embodiment of the present invention, a dual use deployable element for spacecraft, has at least one structural member is attached to a host spacecraft via a gimbal so as to focus radio frequency emissions reflected from at least one of the radio frequency reflection means in a spatial direction to or from a host spacecraft or to or from one or more spaceborne objects, independently of the spatial orientation of host spacecraft. Additionally, one or more other structural members are attached to a host spacecraft also via a gimbal so as to focus the solar-to-electric collection and conversion means in a spatial direction independently of the spatial orientation of the host spacecraft.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 2:
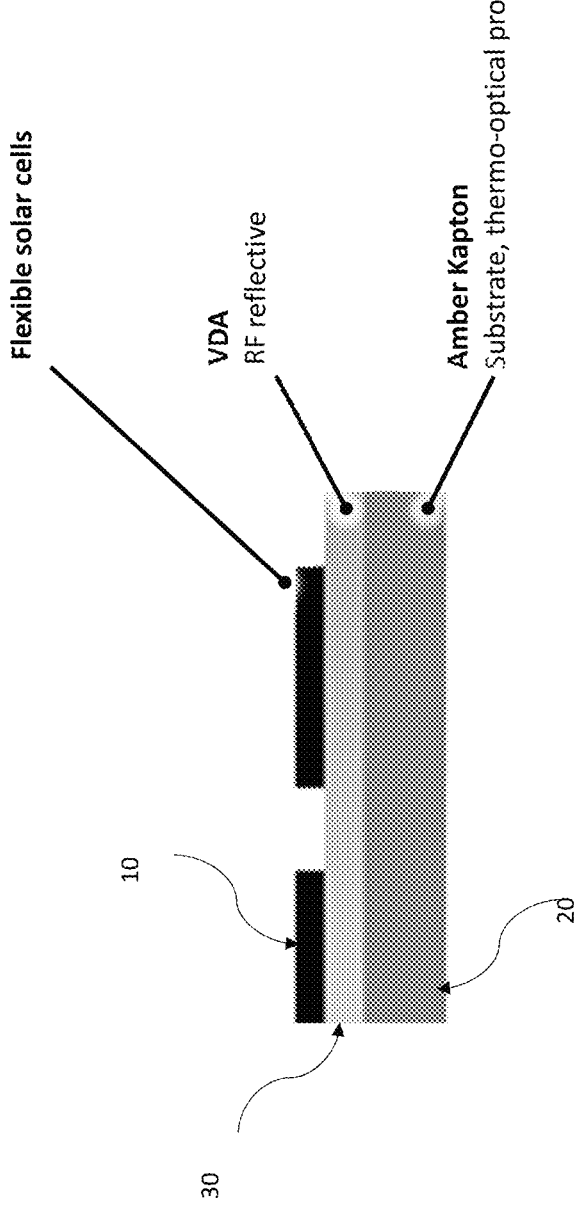
FIG. 2 is a cross sectional representation of the invention's reflectarray assembly depicting solar arrays, reflective metallized deposition layer, and Kapton® substrate.

Referring to FIG. 2, The central concept of the present invention is a Kapton® (polyimide) substrate 20 with a VDM (vapor deposited metal) backside 30 with flexible solar cells 10 mounted to the back of the VDM. Let the Kapton® 20 face be dubbed the 'nearside' (NS) and the solar cell 10 face be dubbed the 'far side' (FS). NS and FS are terms used in spacecraft blanket engineering to describe the relative locations of objects and finishes on the blanket. NS is used to talk about the side nearest a technician installing the blanket on the spacecraft. In this stackup, the Kapton® acts as the flexible substrate 20 that can be both stowed away in a compact volume and also be stretched taut enough to make a flat surface. Optionally, the Kapton® 20 may be carbon-filled (i.e., 'Black Kapton®') to enhance its thermal emissivity and reduce the invention's operating temperature. The VDM 30 provides an RF-reflective surface for the reflector. The flexible solar cells 10 face out from the FS and capture/convert solar energy into electrical energy. Today's flexible solar cells are approximately 20% efficient, the remainder of the solar energy is absorbed thermally and re-emitted as infrared radiation. The Stefan-Boltzmann equation shows that the invention will run at about 70 C in the sun, similar to the temperature of other solar arrays (both flexible and rigid), thus not incurring any performance penalty for combining the two functions. Harness from the solar cells 10 will also route along the FS of the invention.

Figure 1:
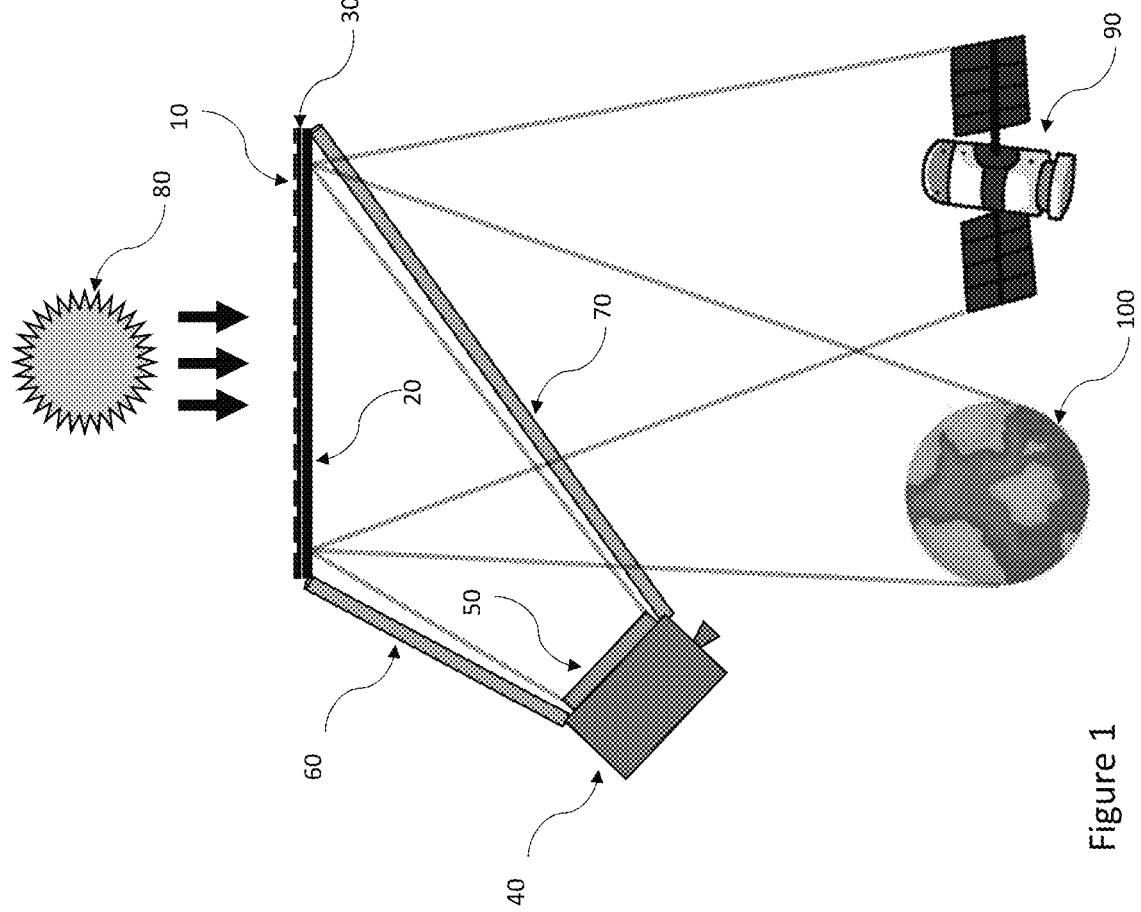
FIG. 1 is a depiction of the present invention comprising a fixed position common RF reflector aperture and solar array aperture in combination with a satellite's transmit and receive phased array.

Referring to FIG. 1, The invention may be structurally supported to the spacecraft 40 via composite tape booms (CTBs), telescoping booms, folding booms, pantographs, inflatable booms, or any other means of creating a boom in space. Either one or multiple such booms may be used to support the invention. Additionally, the invention may be attached directly to the spacecraft 40 in some situations such as schemes involving subreflectors (see 110, FIG. 4). The invention may be either hard-mounted, or in cases requiring it, gimbal-mounted (see 130, 140, FIG. 5). In general, hard-mounting is preferred as the invention is intended for application on smaller spacecraft where body-pointing the spacecraft is a more reasonable concept of operations (CONOPS) than for larger spacecraft where steerable apertures are more important.

The invention requires a perimeter structure 60, 70 that supports and tensions the Kapton® substrate 20. This perimeter structure can be made using CTBs, pantographs, folding rigid booms, telescoping booms, etc. Since the invention is a flat surface, no 3-dimensional structural depth is required, as such the perimeter structure needs only to be a 2-dimensional structure 60, 70 providing a ring or hardpoints to mount the vertices of the Kapton® 20.

The invention is stowed into a small space by folding up the Kapton® 20, the perimeter structure 60, 70 comprising support boom(s) in one embodiment. The deployment sequence involves first deploying the support boom(s), if any, to move the invention away from the spacecraft. Then the perimeter structure is opened up and locked in place. After this, the solar cells' 10 electrical circuits may be switched closed and the solar array can collect energy. RF pattern mapping on the reflector side 30 may then be done to characterize the RF pattern and calibrate it via the phased array to provide the desired pattern.

The deployment sequence will require launch locks and deployment mechanisms. Launch locks constrain the stowed invention for launch. A cradle may be required. To initiate the deployment sequence, launch locks release the invention from the cradle, and/or any other launch constraining hardware. If a CTB or spring-loaded deployment mechanism is used, then the support booms 60, 70 can deploy out immediately after the launch lock is released. The deployment sequence can be regulated by dampers as part of the deployment mechanism or the deployment mechanism can be motor-driven, allowing very slow and regulated deployment. The support boom(s) latch open as they reach their fully deployed position. A similar sequence and options for component set apply to the perimeter structure. The launch lock(s) and deployment mechanism(s) for these are located at the end of the support booms 60, 70.

Since the invention is a highly compact deployable, similar in this way to large aperture flexible reflectors, mission-success is best facilitated by a slow deployment. However, spacecraft with deployable solar arrays that do not function while stowed, often require quick deployments to insure that battery power is not depleted before the solar array is released. The invention is a combination of both such types of deployables. As such, the invention can either be designed for a quick deployment, which will have an expensive cost versus risk curve, or the spacecraft using the invention can include supplemental body-mounted solar cells that can function independently of whether the invention is deployed or not. Thus, the spacecraft can point its body-mounted solar cells to the sun to provide electricity for basic bus functions and accepting deep battery depths of discharge (DoD) until the spacecraft and its operational team are ready to deploy the invention.

The invention's reflector 30 can be used in a number of different arrangements. It is helpful to think of an RF antenna as accomplishing three different tasks: power, focus, and gain. Power means that 'sufficient' RF energy per time (i.e., power) is generated, what is 'sufficient' depends on the gain. Focus means that the beam pattern is directed in order to create the desired pattern on the ground. Gain takes in power and directs it into a narrow direction, in this way, both gain and power determine power-at-the-target which affects how large a communicating partner's antenna must be, and how strong a signal a radar return produces. Power, focus, and gain can be all produced using the same aperture (as in a direct-radiating phased array) or, it can be distributed across multiple objects, for example, a feedhorn can produce power that is then focused at a subreflector and gain is produced by a paraboloid main reflector. In the typical feedhorn-paraboloid reflector pairing, the feedhorn produces power and the reflector both focuses and 'gains' the signal.

The invention may be implemented to provide either gain or both gain and focus. Power for the invention is provided by a feed which may be either a feedhorn or a phased array 50. If the invention's feed is a feedhorn, then the feedhorn merely provides power and the invention provides both gain and focus. If the invention's feed is a phased array 50, then the phased array 50 provides power, but it can also provide focus (and thus also beam steering) to make up for the un-focusing nature of the invention's flat shape.

Figure 4:
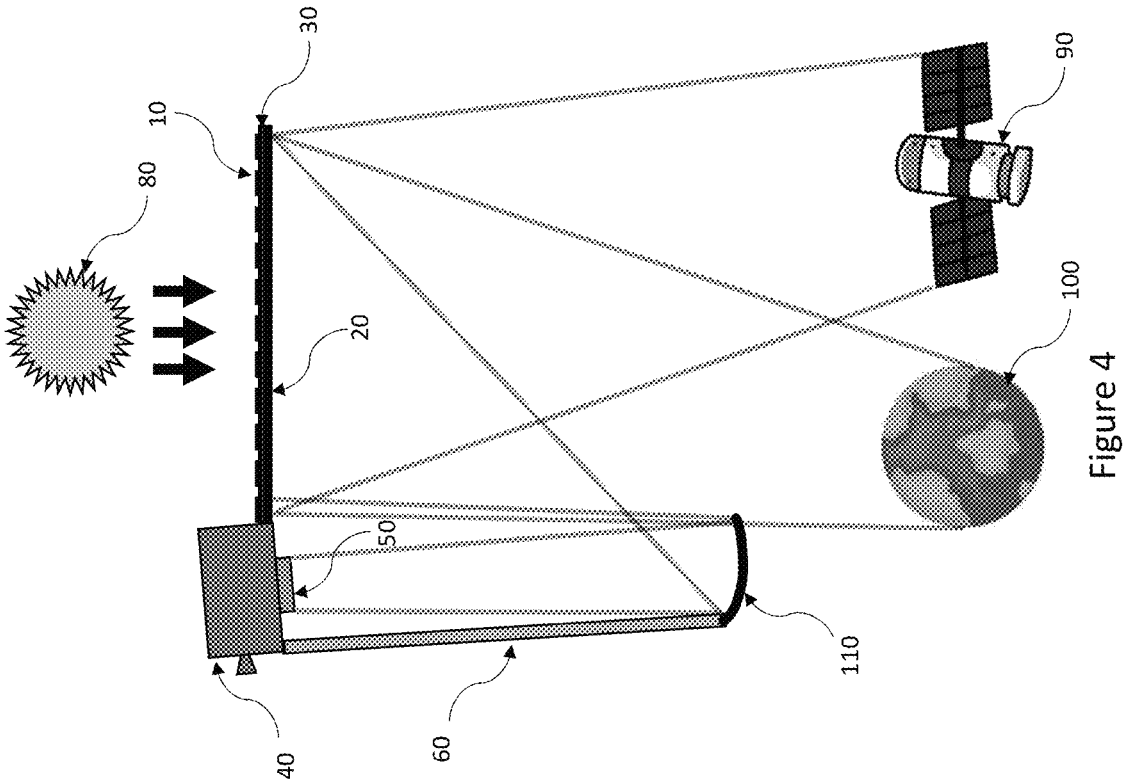
FIG. 4 is a depiction of the present invention comprising a fixed position common RF reflector aperture and solar array aperture in indirect combination with a satellite's transmit and receive phased array through an intermediate subreflector.
Figure 5:
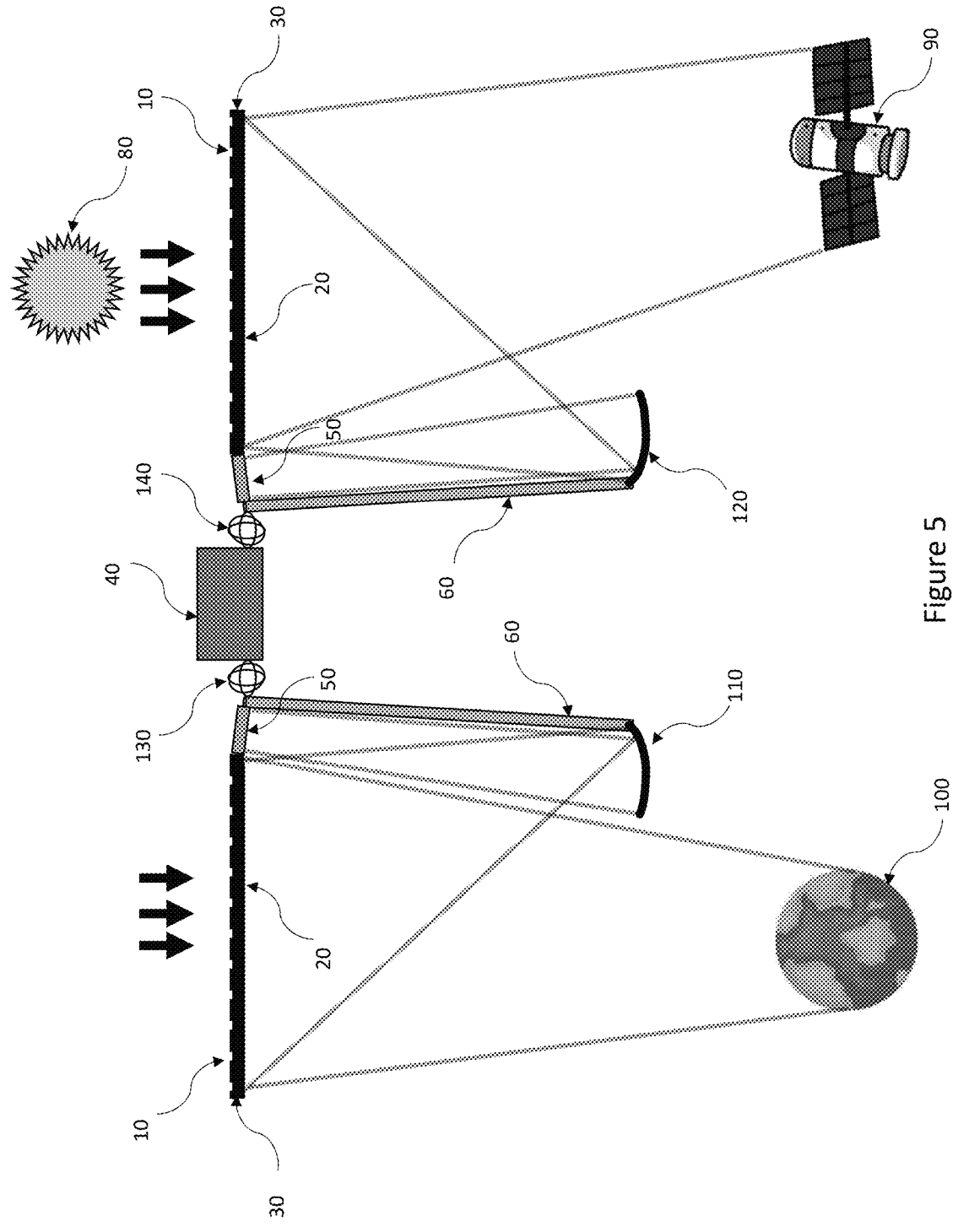
FIG. 5 is a depiction of the present invention comprising two gimballed, non-fixed position common RF reflector apertures and solar array apertures each in indirect combination with one of a satellite's two transmit and receive phased arrays through an intermediate subreflector.

Referring to FIG. 4, an additional embodiment of the invention incorporates a subreflector 110. This subreflector 110 can be designed to provide some or all of the required focus that the flat invention does not provide. A shaped subreflector could provide this capability. Intermediate levels of shaping to provide focusing could also be incorporated to provide a good balance between beam agility and how much focus the phased array 50 must provide. A shaped subreflector 110 with more curvature at the periphery and less curvature at the center is likely to best provide focus given the flatness of the invention. If a feedhorn is used then the subreflector 110 can be optimally focused to work with the invention at the cost of the invention being constrained to a single beam pattern. Such constraint means that the invention can perform some, but not all of the previously described missions.

A very favorable aspect of a two-reflector configuration of the present invention is the invention's main reflector 30 can be mounted to the spacecraft body 40 and only the subreflector 110 need be deployed away from the spacecraft 40. This can reduce the complexity and cost of the support boom 60, 70 while also improving spacecraft mechanical dynamics.

Since the invention is designed to be quite large relative to its spacecraft and since the basic, and likely most common configuration of the invention has a single combined solar array 10 and reflector 30 located to one side of the spacecraft 40, the deployed spacecraft may have its center of gravity (COG) substantially affected by the invention. Accordingly, the spacecraft design should include efforts to manage the shift of the COG and keep the COG in an acceptable location. Such efforts include positioning the spacecraft's thruster(s) such that they are aimed through the COG both before and after deployment, minimizing deployed mass and deployment distance, locating momentum management devices such as momentum wheels, control moment gyros, and magnetic torquer rods at locations that can accommodate both deployed and stowed COGs, and orienting the propellant management device (PMD) in the tank(s) such that shifts in COG over life as propellant is consumed do not cause the COG to shift outside the line-of-action of the thruster(s). Designs incorporating more than one of the invention's combined solar array 10 and reflector 30 will benefit from balancing the locations of the invention's combined solar array 10 and 30 on opposite sides of the spacecraft to manage COG location. The embodiments of the invention with a subreflector 110 design can more easily keep the COG from shifting due to combined solar array 10 and reflector 30 deployment.

The invention can be made using materials and processes (M&P) that are known to manufacturers of flexible solar arrays, flexible reflectors, and spacecraft multilayer insulation (MLI) blankets.

Referring again to FIG. 2, fabrication comprises a sheet of Kapton® 20, VDM 30 (probably vapor deposited Aluminum, VDA) deposited on one side of the Kapton® 20. Then flexible solar cells 10 are affixed to the VDM 30 side of the Kapton® 20. Solar cells 10 are harnessed together and harness is routed toward the perimeter support structure and thence to the support boom(s) (see 60,70, FIG. 1). Temperature sensors, photodiodes acting as sun sensors, and other sensors may also be mounted on the invention's surface with harness routed to the support booms (see 60,70, FIG. 1).

Another feature of the present invention is employing solar collection on both sides of the Kapton® known as bifacial solar arrays (BFSA). This approach (not shown) comprises monofacial solar cells mounted on both sides of a substrate is judged to be best suited to use of flexible substrate solar cells, which are required for use in the present invention. Because flexible substrate solar cells are lighter than rigid solar cells, the mass cost of this approach is feasible. BFSA obviously have to be mounted such that their backside is not obscured by opaque objects. This is typically done by mounting the BFSCs on a hollow grid structure. While that is not possible with the need for a flexible solar array as employed in the present invention, a BFSA can be mounted on at least a partially transparent Kapton® structure. This can be accomplished by partially populating the reflectarray with opaque metallic patterning and/or by creating that patterning with optically translucent but electrically conductive materials such as Indium Tin Oxide (ITO) that can be patterned on the Kapton®. The Kapton® and the likely partial coverage by opaque metal patterning will cause the backside of the solar cells to collect less than the front side, but the ability to collect even a fraction of the solar collection on the backside (relative to the front side) has major beneficial effects for allowing the present invention to stay in-mission for longer periods of time even while the primary front side of the flexible solar array is not facing the sun.

Support boom(s) (see 60,70, FIG. 1) are manufactured separately and bolted and/or adhered onto the perimeter structure. Harness is routed down the boom(s) (see 60,70, FIG. 1). Stowage hardware such as cradles, launch locks, deployment mechanisms, stowage boxes and doors, et cetera are also built and integrated onto the rest of the invention's structure.

The invention is then stowed and deployment tests can be executed. Function tests of the solar array 10 and reflector 30 and environmental tests (thermal cycling, vibration) can be performed.

The invention would be manufactured by a deployable spacecraft manufacturer, possibly via a collaboration with a manufacturer of flexible solar arrays. The manufacturer of the invention would deliver the invention to an integrator of small spacecraft. The spacecraft integrator would install the invention on the spacecraft per negotiated interfaces. The spacecraft integrator would perform tests on the assembled spacecraft with the invention installed and in the stowed, or possibly deployed, configuration.

The spacecraft is then launched individually on a small launch vehicle, or with many other spacecraft (of the same or different designs) on a larger launch vehicle. The spacecraft incorporating the invention should be designed with the battery charge duration in mind—from the time that the launch vehicle releases from the ground support umbilical until the time that the invention is deployed (or until the time any body-mounted solar cells are sun-facing), the spacecraft must operate on battery power.

The invention is then deployed, as previously described, turned into the sun, and on-orbit RF checks and calibration can begin. When these steps are complete, the invention is ready for hand-off to the ultimate customer to accomplish the mission.

Referring again to FIG. 1, the invention can be used continuously or intermittently, depending on mission. Continuous use requires the invention's host spacecraft 40 to keep the RF targets 90, 100 (what the invention communicates with or observes) more-or-less on the opposite side of the spacecraft 40 from the sun 80. Some off-pointing can be achieved by permitting the solar array 10 to not face normal to the sun and to beam steer off the invention's reflector 30 via the phased array 50. The invention is suited to provide very large amounts of electrical power relative to the size of the spacecraft it supports, accordingly, many missions may be able to be accomplished continuously (or at least at a high duty cycle) by off-pointing the invention's solar array 10 significantly.

For some missions, such as tactical ISR, only intermittent mission operation may be required. In this case, the invention may be repointed between mission and housekeeping phases—alternately doing the mission and replenishing electrical and thermal subsystems. As depicted in FIG. 1, the invention will experience a very asymmetric solar radiation torque (i.e., the pressure of sunlight will tend to torque the spacecraft). This can be managed via brute force methods of using standard reaction wheels and mag torque rods to fight that torque. The problem with the brute force approach is that it requires larger reaction wheels, mag torque rods that only work in some orbits, and the possibility that if either of these two methods get saturated that propellant may need to be wastefully expended to maintain attitude control. However, with the configuration of the present invention depicted in FIG. 1 and other asymmetric configurations of it, the solar radiation torque can instead be used as a resource rather than a hindrance. Those skilled in the art of spacecraft attitude control will be able to use this solar radiation torque to balance other perturbing torques on the spacecraft by subtly adjusting the orientation of the spacecraft employing the present invention or in gimballed and hinged configurations as in FIG. 5 and FIG. 6, respectively, into the sun while in housekeeping i.e., not mission mode. In this way, the present invention's asymmetry will be used as a resource, rather than a hindrance, by the resourceful spacecraft attitude control engineer.

Several alternative configurations are within the scope of the present invention. Different materials can be used, such as black Kapton® or amber Kapton® or white Kapton®. Non-Kapton® materials could also be used, but Kapton® is preferred because it is known to be an excellent material in the near-earth space environment.

Likewise, within the scope of the invention are multiple forms of support booms 60,70 and perimeter structure. Multiple antenna configurations have been described including different forms of feeds (feedhorns or phased arrays), the presence or absence of subreflectors 110, and different types of subreflectors 110 (flat, paraboloid, reflectarray, shaped). The tasks of providing power, focus, and gain can be reassigned amongst the various options for antenna components. Antenna components can be designed to cheaply permit a single beam pattern or to permit highly capable beamforming.

Figure 3:
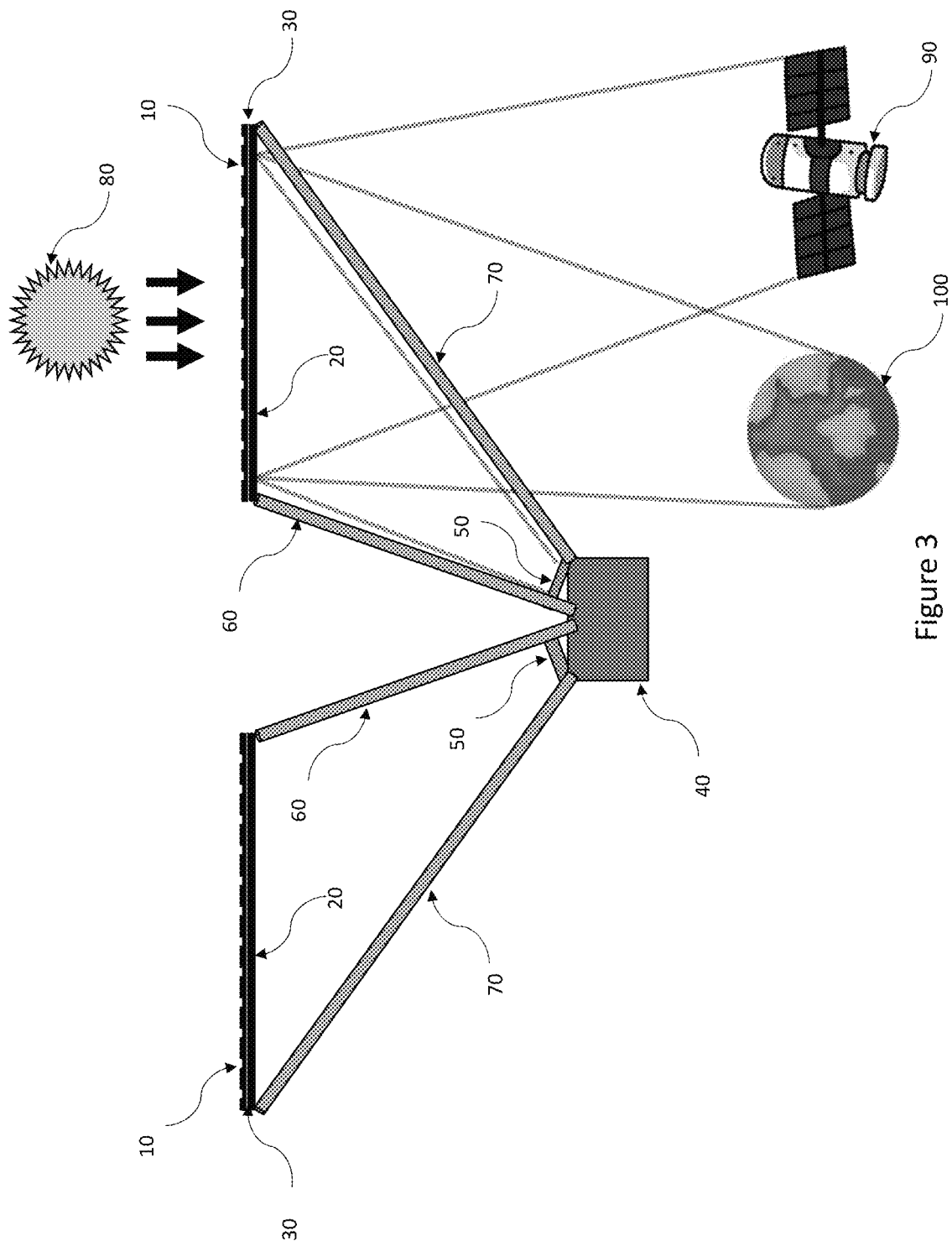
FIG. 3 is a depiction of the present invention comprising two fixed position common RF reflector apertures and solar array apertures each in combination with one of a satellite's two transmit and receive phased arrays.

A single embodiment of the present invention can be used on a spacecraft or multiple embodiments (see FIG. 3) can be used for applications such as relay communications, sparse aperture radar imaging, or the generation and transmission of other radio frequency (RF) signals. The invention can be hard mounted to the spacecraft or it can be gimballed (see FIG. 5, 130, 140).

Figure 6:
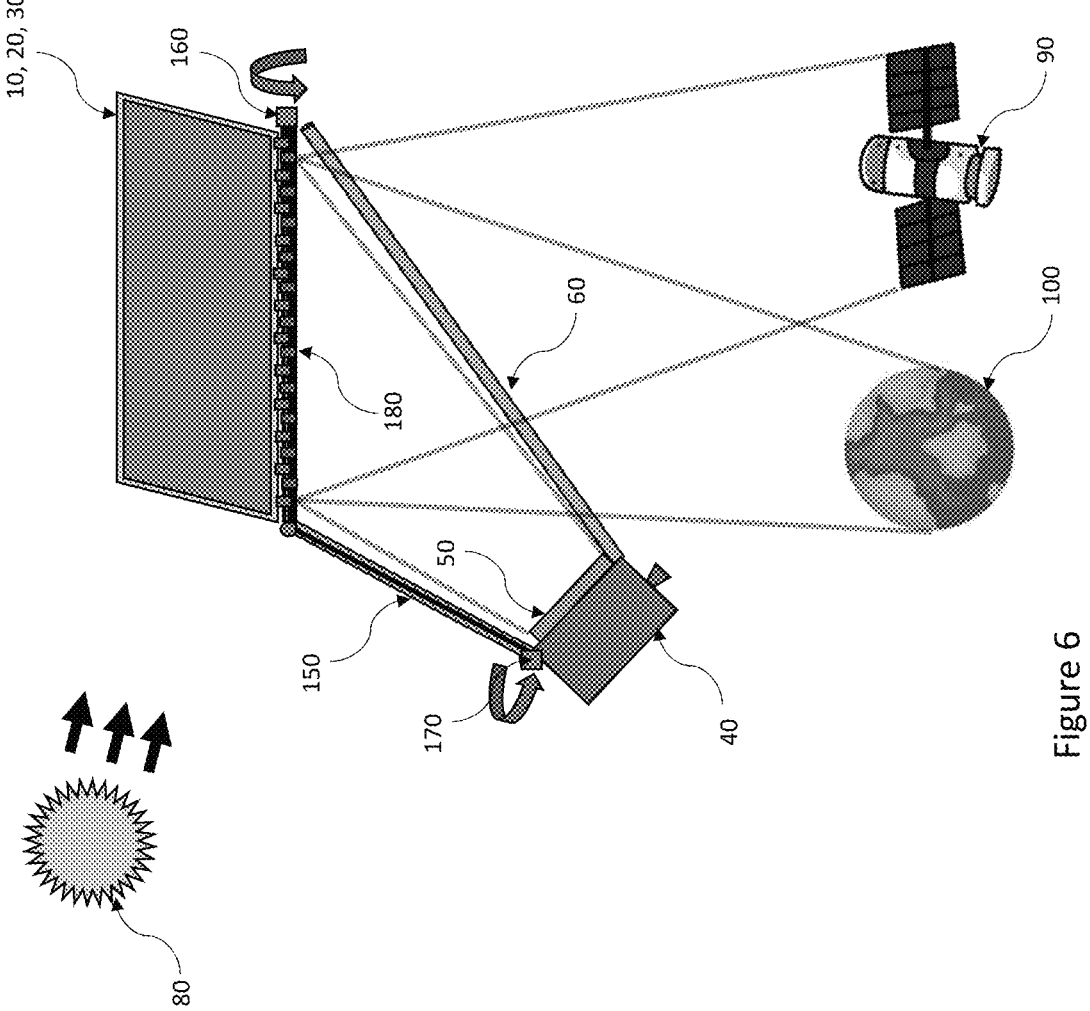
FIG. 6 is a depiction of the present invention comprising a rotatable, non-fixed position common RF reflector aperture and solar array aperture in combination with a satellite's transmit and receive phased array.

Referring to FIG. 6 is depiction of the present invention comprising a rotatable, non-fixed position common RF reflector aperture 30 and solar cell array 10 in combination with a satellite's transmit and receive phased array. This is accomplished by mounting the combined solar array 10 and reflector 30 hingedly 180 to the structure of the spacecraft 40. A motor 170 provides a torquing force to one end of a transmission element 150 and the other end of the transmission element 150 provides the torquing force so as to rotate the common RF reflector aperture 30 and solar cell array 10 about the hinges 180. This embodiment of the present invention provides an additional spatial degree of freedom to optimize the orientation of the solar cell array 10 with the sun, or the phased array 50 with either target 90, 100, thereby reducing reliance upon total realignment of the spacecraft 40.

Another variation (not shown) within the scope of the invention could at least partially relieve the co-pointing constraint by putting the solar cells 10 and reflector 30 on two separate adjacent surfaces. The solar cell layer 10 can be independently rotated about an axis to provide freer pointing.

Still, another variation (not shown) within the scope of the present invention is to make the flat reflector surface an active reflectarray. The reflectarrays discussed up to this point have been passive (i.e., constrained to provide a single reflectance behavior and not frequency tunable). However, active reflectarrays (not shown) can vary their apparent RF behavior dynamically. This could allow beamforming to be accomplished even with a single (or multiple) feedhorns rather than a phased array 50. In concert with a phased array 50, an active reflectarray could provide even more RF flexibility.

One way of achieving an active phased array is to embed microwave photonics (not shown) within the invention's substrate. In this form, RF impinging on the reflector would be converted to optical energy, then photonic waveguide and switches reroute the signal and then the signal is converted back to RF and transmitted off the reflector. This relies on photonic integrated circuits. The invention's foundational philosophy is that RF engineering is advancing more rapidly than mechanical engineering, and thus optimal systems in the future will be more electrically complicated and more mechanically simple.

What is claimed is:

1. A spacecraft system, comprising:
a spacecraft operable for moving within an orbit around an object in outer space;
a perimeter support structure connecting a dual use deployable element to the spacecraft and constructed to deploy the dual use deployable element away from the spacecraft at predetermined location in outer space;
wherein the dual use deployable element includes:
a solar-to-electric collection and conversion element, wherein said solar-to-electric collection and conversion element comprises a photovoltaic cell array;
a radio frequency reflection element; and
a deployable substrate, wherein said deployable substrate comprises polyimide;
wherein said radio frequency reflection element comprises vapor deposited metal on a backside of said deployable substrate;
wherein said solar-to-electric collection and conversion element is mounted to a back of the radio frequency reflection element; and
wherein said solar-to-electric collection and conversion element and said radio frequency reflection element are oriented in spatially opposed directions.

2. The system of claim 1, wherein the perimeter support structure includes an electrical pathway between said solar-to-electric collection and conversion element and the spacecraft.

3. The system of claim 1, wherein the perimeter support structure is any one from the group consisting of: composite tape booms (CTBs), telescoping booms, folding booms, pantographs, and inflatable booms.

4. The system of claim 1, wherein said radio frequency reflection element comprises metallization.

5. The system of claim 1, wherein said substrate focuses reflected radio frequency emissions to or from the spacecraft or to or from the objects.

6. The system of claim 1, further comprising a plurality of deployable substrates constructed to focus reflected radio frequency emissions to or from the spacecraft or to or from one or more spaceborne objects.

7. The system of claim 1, further comprising a gimbal connected to the perimeter support structure, to independently control of the spatial orientation of the dual use element relatively to the spacecraft.

8. The system of claim 7, wherein the gimbal is operable for focusing said solar-to-electric collection and conversion element in a spatial direction independently of the spatial orientation of the spacecraft.

9. The system of claim 5, wherein said reflected radio frequency emissions are focused onto said radio frequency reflection element via a radio frequency radiating and receive array.

10. The system of claim 5, further comprising a subreflector deployed away from the spacecraft.

11. The system of claim 10, wherein said reflected radio frequency emissions are focused onto said radio frequency reflection element via the subreflector.

12. The system of claim 1, further comprising a hinge connected between the perimeter support structure and the dual use element to independently permit the spatial orientation of the dual use element.

13. The system of claim 1, wherein said deployable substrate comprises a bifacial solar-to-electric collection and conversion element.

14. The system of claim 1, wherein said deployable substrate is oriented so as to utilize solar radiation torque to orient said spacecraft.

* * * * *